Sept. 5, 1972 W. SCHELKMANN 3,689,337
METHOD OF RECAPPING TIRES
Filed June 25, 1969 2 Sheets-Sheet 1
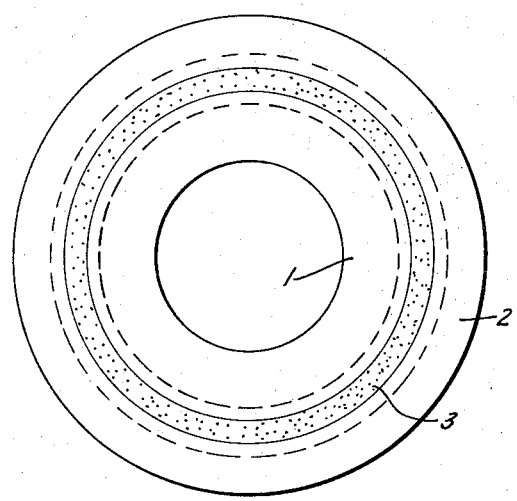
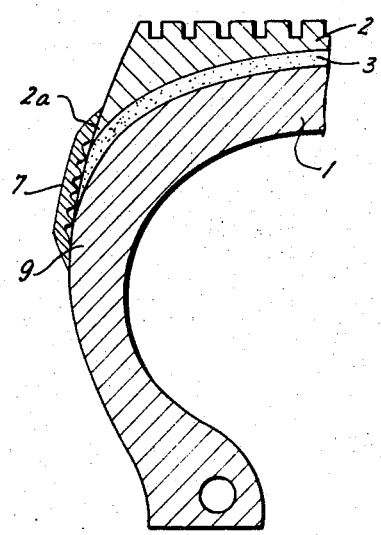
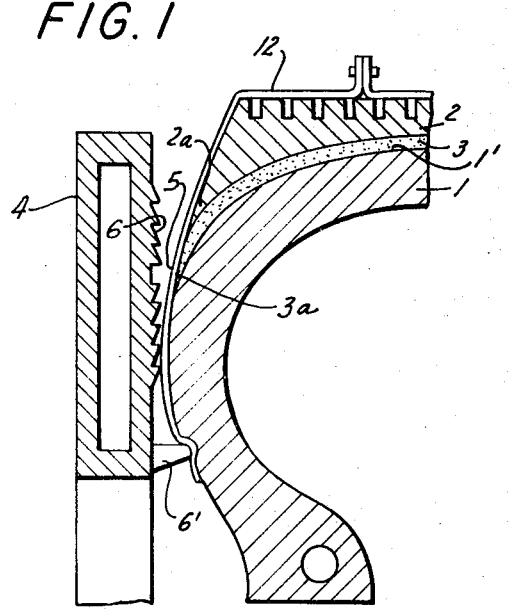
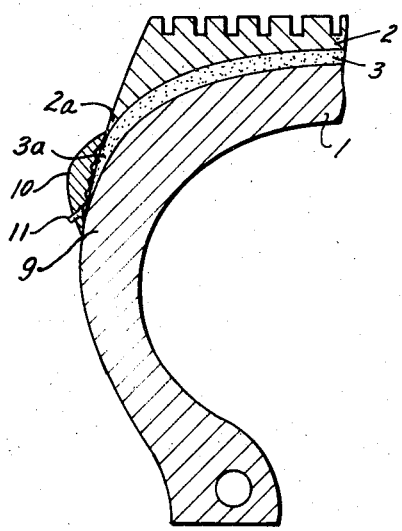
INVENTOR
Wilhelm Schelkmann
BY Michael J. Striker
ATTORNEY Sept. 5, 1972 W. SCHELKMANN 3,689,337
METHOD OF RECAPPING TIRES
Filed June 25, 1969 2 Sheets-Sheet 2

INVENTOR
Wilhelm Schelkmann
BY
Michael J. Striker
ATTORNEY

United States Patent Office 3,689,337
Patented Sept. 5, 1972

3,689,337
METHOD OF RECAPPING TIRES
Wilhelm Schelkmann, Witten, Germany, assignor to Vakuum Vulk Holdings, Ltd., Nassau, Bahamas
Filed June 25, 1969, Ser. No. 836,454
Int. Cl. B29h *17/36*
U.S. Cl. 156—95                               8 Claims

ABSTRACT OF THE DISCLOSURE

Method of recapping tires comprising the first step of forming an assembly consisting of a carcass, a profiled tread superimposed upon the outer surface of the carcass, and a layer of binding material sandwiched between the outer surface and the tread with marginal portions of the tread and layer extending to opposite sides of the carcass, the second step of establishing a connection between the carcass and the tread across the marginal portions of the layer, and the third step of permanently binding the layer to the tread and carcass.

BACKGROUND OF THE INVENTION

The present invention relates to a method of recapping tires for automotive vehicles by vulcanizing a profiled tread upon the upper surface of a tire carcass and the expulsion of air entrapped between the tread and the carcass surface prior to vulcanization.

It is known to recap tires with pre-vulcanized profiled treads by means of a layer of binder material sandwiched between the outer surface of the tire and the tread, in which the parts to be united by vulcanization are wrapped in a flexible air-tight cover sheet so that the cover sheet forms a closed wrapper over the parts, and in which air or other gases are removed from the closed wrapper so that the parts will be pressed by atmospheric pressure substantially without clearance against each other. The thus assembled parts enclosed air-tightly in the wrapper are then subjected in an autoclave to heat and pressure, whereby the tread is permanently bonded to the outer tire surface by the layer of binding material.

Considerable difficulties are encountered in such a method of recapping tires to positively prevent air enclosure between the bottom surface of the tread and the outer tire surface during application of the tread to the outer tire surface, especially if the bottom surface of the tread is curved in direction transverse to its elongation.

Another difficulty arises from the fact that the outer tire surface, curved in direction transverse to its circumference, has in a plane of symmetry of the tire normal to the tire axis a circumference of a greater length than the circumference of the tire at the opposite side portions thereof. When an elongated tread is wrapped around the outer tire surface, the central portion of the tread will extend over a portion of the outer tire surface having a greater circumferential length than the side portions of the tread and therefore, the central tread portion has to be expanded or the side portions have to be contracted to compensate for the difference in the circumferential length of the outer tire surface, which will create in a tread known construction undue stresses in the tread which will detrimentally affect its wear and/or the bond between the inner tread surface and the outer tire surface to be recapped.

As regards the above disadvantages, attempts have been made to overcome these difficulties by providing an elongated tread which can be applied to the outer tire surface and which is constructed in such a manner that the difference between the circumferential length of the outer tire surface in a plane of symmetry of the tire normal to the tire axis and its circumferential length at the side portions of the tire can be compensated for by providing the tread section with an inner surface of a predetermined curvature transverse to the elongation of the tire along a radius greater than that of the tire.

When a tread having an inner surface curved as set forth above is applied against the worn outer tire surface, a central portion of the tread is arranged so that it will first engage the outer tire surface so that as the inner tread surface is subsequently applied over its whole area to the outer tire surface any air between the inner tread surface and the outer tire surface will be gradually squeezed out between the surfaces so that air enclosures between these surfaces are positively avoided.

However, despite the above attempts to efficiently overcome the named disadvantages, no suitable solution has yet been found to vulcanize the layer of binding material in such a manner that during the binding process an equal flow of the binding material takes place so that an overall even bondage is effected between the tread and the tire carcass.

SUMMARY OF THE INVENTION

It is an object of the present invention to overcome these difficulties during application of a tread to the outer surface of the tire to be recapped and during subsequent bonding of the tread to the tire surface.

It is a further object of the present invention to provide for a tread or tread sections to be applied and subsequently to be bonded to a worn outer tire surface, which are constructed in such a manner that air enclosures between the inner tread surface and the outer tire surface during application of the tread or tread sections to the outer tire surface is positively prevented.

The method for recapping a tire with the above features comprises the first step of forming an assembly consisting essentially of a carcass, a profiled tread superimposed upon the outer surface of the carcass, and a layer of binder material sandwiched between the outer surface and the tread with marginal portions of the tread and layer extending to opposite sides of the carcass; the second step of establishing a connection between the carcass and the tread across the marginal portions of the layer; and the third step of permanently bonding the layer to the tread and carcass.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a partial cross sectional view through a tire and through a heating collar laterally applied to the tire;

FIG. 2 is a cross sectional view through a tire and illustrating the tread layer and binder material;

FIG. 3 is a partial cross sectional view through a tire and illustrating the superimposed layers of FIG. 2 and a foil connected over marginal portions of the layer and a lateral portion of the tire carcass;

FIG. 4 is a partial cross sectional view through a tire as in FIG. 3, and illustrating a further embodiment of connecting a foil over the layers and marginal portions thereof;

DESCRIPTION OF THE PREFERRED EMBODIMENT

Figure 5:
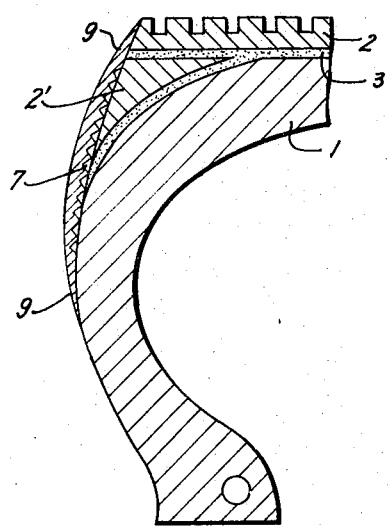
FIG. 5 is a partial cross sectional view of a tire illustrating a further mode of applying a tread to the tire.

Referring now to the drawings and initially to FIGS. 1 and 2, it will be seen that the tire carcass 1 to be recapped has an outer curved tire surface 1' upon which a profiled tread 2 is superimposed while a layer of binding material 3 is sandwiched between the outer surface 1' and the tread 2. Marginal portions of the tread and binding material, 2a and 3a, respectively, extend to opposite sides of the tire carcass and overlap lateral portions of the tire at 5 in FIG. 1. The tread 2 is to be bonded to the upper surface 1' of the carcass tire. To this end an annular heating collar 4 known per se, is pressed against both lateral sides of the tire and engages the junction 5 of the marginal portions of the layer of binding material and the tread to effect a connection between the marginal portion 2a of the tread and the carcass across the marginal portion 3a of the binding material. However, before such connection, it is necessary to expel air enclosures between the respective surfaces of the tire assembly, including the tread, the binder material and the carcass. To this end, the aforementioned components are enclosed in an air-tight cover sheet 12 which is preferably formed from a single sheet of flexible material as described in detail in U.S. Pat. 2,966,936. The cover sheet 12 covers only the tread, the portions of the binding material extending laterally beyond the tread, and part of the outer tire surface adjacent to the edge portions of the layer of binding material, and such a cover is connected to the side walls of the tire in a fluid-tight manner such as for example by projection 6' of heating element 4, which system is known and described in U.S. Pat. 3,207,647. After the assembly has been enclosed in the cover sheet 12, so that the cover sheet forms a closed wrapper over the aforementioned components, air is removed from the closed wrapper, preferably by evacuating the air from the interior of the closed wrapper so that the components enclosed in the wrapper will be pressed by atmospheric pressure substantially without clearance against each other, while all air and/or additional gas enclosures between the superimposed components will be removed. The marginal portions 2a and 3a and the tire surface adjacent these portions are then engaged by the annular heating collar 1 so as to effect bondage of the marginal portion 2a of the tread 2 to the tire surface by means of vulcanizing the marginal portion 3c of the binding material 3. By vulcanizing the marginal portion 2a to the lateral portion of the tire across marginal portions 3a, the remainder of the binding material intermediate the marginal portions 3a is completely enclosed between the tread and the upper surface of the tire. The assembly is now subjected to heat, for example in an autoclave or other high-pressure heater, and outer pressure to permanently bond the inner tread surface to the outer tire surface.

To avoid distortions of the tread and unequal flow of the layer of binder material when subjected to heat, a fluid is fed into the autoclave and in which the tire assembly is placed so as to maintain during increase of pressure onto the outer surface of the cover sheet a pressure difference between the outer and inner surface of the cover sheet. Such a system has been described in U.S. Pat. 3,325,326.

As shown the inner surface of the heating collar 4 engaging the marginal portions of the layers of binding material and tread, is provided with a profiled surface 6 operative to firmly engage these portions and the adjoining portions of the carcass. This profiled surface comprises a plurality of saw-tooth shaped projections consisting of two groups with the teeth of each group inclined towards the marginal portions of the layer so as to effect, when engaged with the portions 2a, 3a and the adjoining tire surface, a firm grip with these portions and thereby press the portion 2a in downward direction and that portion of the tire adjoining the marginal portions 3a in upward direction. In this manner a solid connection between these portions is established.

The tread strip 2 preferably is made of an elastomeric material and connection of its marginal portions to lateral portions of the tire may, in addition to vulcanization, equally well be establised by stitching or taping said portions to each other.

Also, as shown in FIG. 3, the marginal portions of the binding material 3 may be connected to the adjoining portions of the tread and carcass by means of foil 7, the latter being connected at its one end to marginal portion 2a of the tread and at its other end to the tire portion 9 and enclosing the marginal portions of the binding material at 5. As regards this latter embodiment, the inner surface of the foil may be profiled or a profiled plate may be placed intermediate the foil and the respective layer and tire sections.

FIG. 4 shows a further embodiment in which the marginal portion 3a of the layer of binding material is interconnected with the portions 2a and 9 of the tread and tire respectively, by means of an elastic concave ring 10 whose inner surface and upper and lower side are operative to engage the respective sections. The back portion of ring 10 is reinforced so that the ring is biased and when connected to the respective sections, a firm connection is established.

The ring 10 further may comprise a valve member 11 operative to remove air from between the respective layer sections and, in addition, the ring is provided with an inner profiled surface, again to effect a positive connection of the ring with the respective sections.

FIG. 5 shows an embodiment in which the tread is seen to combine an upper tread 2 which has a substantially rectangular configuration and is bonded to the tread surface of the tire carcass 1 and defines with this surface at axially opposite sides thereof, circumferentially extending gaps of substantially wedge-shaped configuration. A pair of annular inserts 2' having complementary configurations are received in the gaps and are bonded to the tread surface and the tread strip at axially opposite sides of the tire surface. In this embodiment the binding layer has two marginal portions at each side of the tire and each two of which marginal portions in this instance are sealed by a single foil 7. Alternatively, each marginal portion of the binding layer may be sealed individually by a single sealing member.

Figure 6:
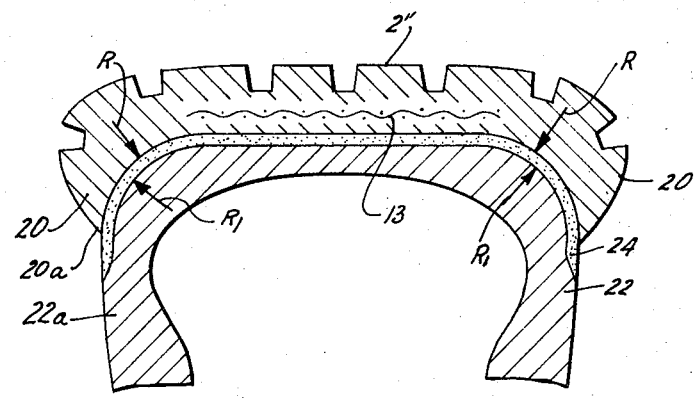
FIG. 6 is a partial cross sectional view of a tread strip and tire ready to be bonded to one another.

FIG. 6 shows a further embodiment in which the assembly including a profiled tread strip 20 superimposed on the upper surface of the carcass 22 and a layer of binding material 24 interposed between the tread and the upper surface, is about ready to be connected into a recapped tire. The inner surface of the tread strip in direction transverse to its circumference has a curvature whose radius R is smaller than the radius $R_1$ of curvature of the mating upper surface of the tire carcass so that in assembled condition the tread strip effects radial compression of the carcass while the carcass tends to effect radial expansion of the tread. In this manner a positive sealing abutment of the marginal portions 20a and 24a against the respective lateral tire portions 22a is effected. Flexible reinforcement, such as at 13, may be embedded in the tread strip.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of recapping tires for automotive vehicles comprising the steps of forming an assembly of a carcass, a profiled tread superimposed upon the outer surface of said carcass, and a layer of binding material between said outer surface and said tread with marginal portions of said tread and layer extending to opposite sides of said carcass; connecting said carcass and said tread across said marginal portion of said layer by a circumferentially extending cover covering said marginal portion and bonded to said carcass and said tread; permanently bonding said layer to said tread and said carcass, and expelling air from opposite sides of said layer before the step of bonding said layer to said tread and said carcass.

2. A method as defined in claim 1, wherein said step of connecting said carcass and said tread across said marginal portion of said layer comprises the step of bonding a foil to said carcass and said tread extending circumferentially across said marginal portion of said layer.

3. A method as defined in claim 2, wherein said foil is provided with an inner corrugated surface and wherein said step of expelling air from opposite sides of said layer comprises the step of evacuating air from beneath said corrugated surface.

4. A method as defined in claim 2, and including the step of sandwiching a profiled plate between said foil and said marginal portion of said layer.

5. A method of recapping tires for automotive vehicles comprising the steps of forming an assembly of a carcass, a profiled tread superimposed upon the outer surface of said carcass, and a layer of binding material between said outer surface and said tread with marginal portions of said tread and layer extending to opposite sides of said carcass; connecting said carcass and said tread across said marginal portion of said layer by applying an elastic concave ring under pressure to marginal portions of said tread and said carcass across said marginal portion of said layer; permanently bonding said layer to said tread and said carcass; and expelling air from opposite sides of said layer before the step of bonding said layer to said tread and said carcass.

6. A method as defined in claim 5, wherein said ring is provided with an inner corrugated surface and wherein said step of expelling air from opposite sides of said layer comprises the step of evacuating air from beneath said corrugated surface.

7. A method of recapping tires for automotive vehicles comprising the steps of forming an assembly of a carcass, a profiled tread superimposed upon the outer surface of said carcass, and a layer of binding material between said outer surface and said tread with marginal portions of said tread and layer extending to opposite sides of said carcass; connecting said carcass and said tread across said marginal portion of said layer; permanently bonding said layer to said tread and said carcass at elevated temperature and pressure; and expelling air from opposite sides of said layer before the step of bonding said layer to said tread and said carcass.

8. A method as defined in claim 7, wherein said assembly is first subjected to vacuum before said layer is bonded to said tread and said carcass at elevated temperature and pressure.

References Cited
UNITED STATES PATENTS

| | | | |
|---|---|---|---|
| 2,966,936 | 1/1961 | Schelkmann | 156—96 |
| 3,325,326 | 6/1967 | Schelkmann | 156—96 |
| 3,409,491 | 11/1968 | Pacciarini et al. | 156—128 |

BENJAMIN A. BORCHELT, Primary Examiner

D. BENT, Assistant Examiner

U.S. Cl. X.R.

156—128